United States Patent
Esposito (10) Patent No.: US 6,883,512 B2
(45) Date of Patent: Apr. 26, 2005

(54) PORTABLE GRILLING APPARATUS

(76) Inventor: Michael Esposito, 20 Towerhill Ave., Farmingvill, NY (US) 11738

( * ) Notice: Subject to any disclaimer, the term of this patent is extended or adjusted under 35 U.S.C. 154(b) by 0 days.

(21) Appl. No.: 10/424,683

(22) Filed: Apr. 28, 2003

(65) Prior Publication Data
US 2004/0211404 A1 Oct. 28, 2004

(51) Int. Cl.⁷ ................................. A47J 37/00
(52) U.S. Cl. ............... 126/9 R; 126/25 R; 126/9 B
(58) Field of Search ............... 126/9 R, 25 R, 126/40, 50, 9 A, 9 B, 29, 30

(56) References Cited

U.S. PATENT DOCUMENTS 3,109,420 A * 11/1963 Ott et al. .................. 126/9 R
3,682,154 A * 8/1972 Mollere ..................... 126/9 A
4,211,206 A * 7/1980 Darbo ....................... 126/9 R
4,971,045 A * 11/1990 Probst ....................... 126/65
5,163,359 A * 11/1992 McLane, Sr. ............... 99/447

* cited by examiner

Primary Examiner—James C. Yeung
(74) Attorney, Agent, or Firm—Thomas A. O'Rourke; Bodner & O'Rourke (57) ABSTRACT

A grill assembly that may be assembled and disassembled without the use of tools is disclosed. The grill assembly has a housing having a front wall, a rear wall and opposing side walls. The front and rear walls are removably connected to each of the side walls. The housing also has a top surface and a bottom surface and a grilling surface across generally the top surface of the housing. There is also a base which receives the bottom surface of the housing. The base is provided with a knee wall that retains the housing in place in the assembly. The base is provided with a reservoir adapted to receive water for reducing the risk of fire due to burning grease, fat or other flammable material.

14 Claims, 11 Drawing Sheets

PORTABLE GRILLING APPARATUS

FIELD OF THE INVENTION

The present invention relates to improvements in cooking devices, particularly in the area of portable grilling apparatus especially grilling apparatus that can be readily dismantled without the necessity of tools and which can store in a compact form.

DESCRIPTION OF THE PRIOR ART

The grilling of food products is a familiar way of preparing meals particularly during the warmer months of the year. Even though there have been some concerns as to possible health risks to foods prepared in this manner, the popularity of grilling is at an all time high. Traditionally there have been two types of fuel for grilling, using gas or using a wood or charcoal. Each type of fuel has its devotees. Gas grills can be either natural gas or propane. The wood or charcoal users typically rely on one or more hardwoods as the fuel. In view of the present great interest in grilling as a method of preparing foods, there have been a number of new product designs in the field of grills. For example, many of the more expensive grills are currently made of a stainless steel or a brushed aluminum so that they withstand the elements better over the years. Despite the improvements in the materials used in the grills today, the basic functionality of the grill has not changed significantly over the years. Typically, the grill has a housing that supports a metal grill for placing the food above the heating surface. A cover may also be present to protect the cooking food from windblown debris or insects. The cover also has been found to improve the cooking of certain products by retaining more of the heat released by the fuel and thereby raising the temperature of the grill to quickly seal the juices in the foods, particularly for meat products.

Because of the popularity of grilling food there is a desire among consumers to take the grilling experience to new venues. Whereas in the past barbecue grills were a backyard staple, many people now try to bring the grill to sporting events, on camping trips, on picnics, to the beach etc. Many people enjoy tailgate parties at various sporting events. In addition, many people when using public parks prefer to bring there own grill for picnics as they ate assured that the grill they are using has been suitably cleaned. Conventional grills are frequently difficult to disassemble when not in use and easily put together when needed. Similarly, if you do not disassemble the grill they are bulky and difficult to transport in a compact condition. Many grills are also too bulky to fit conveniently in the available vehicle space. Others are difficult to assemble and disassemble. Many also required tools that many people forgot to pack when taking the grill thus making it difficult to use. As a result, there has been a need for an improved portable grill.

Another of the major problems in cooking grills is the presence of flammable greases and fats in close proximity to the flame. It is not uncommon during the grilling process for the meats to drip these fats and greases onto the coals causing them to ignite. Sometimes the volume of grease and the nature of the fire is such that these flare ups can be quite extensive and surprising to the consumer who is suddenly faced with a difficult decision of dousing this flare-up and simultaneously ruin the food or hope that the grease and fats burn out quickly without damage to the food or the adjacent area. In a worst case situation, the flare up can spread out of the grill to the surrounding area. These problems are not just limited to the outdoor barbecue grill. In recent years many stove manufacturers have products in their line that permit the grilling of food indoors on the stove with a grilling feature.

In many instances where there is such a flare up the consumer is not sure of the best means to extinguish the fire. For example, a fire extinguisher is frequently the best choice from a safety stand point as it has the ability to extinguish grease fires quickly and safely. Unfortunately, the culinary repast that caused the flare up suffers from the fire retarding material evacuated from the extinguisher. The conventional fire extinguishers typically spray their material over a wide area necessitating a clean up of not only the work area but also the food In addition, despite their availability, many consumers either do not have fire extinguishers or if they do have them, they are typically stored away for "safe keeping" where they cannot be reached or found quickly in an emergency. For outdoor grills, a fire extinguisher is rarely if ever in close proximity to the grilling area.

One alternative to the fire extinguisher is sand. Sand, while being a satisfactory material to extinguish flare ups, does present a problem to the food product it touches. The sand will frequently adhere to the cooking food requiring it to be cleaned or in a worse case discarded. Another material that is frequently used to extinguish flare ups is water. One of the problems with using water is that the flammable grease and fats float on water and are not extinguished by the water and in fact the water can spread the fire. Because of this, fire experts do not recommend that water be used on grease fires. Similarly, as with the case with sand, the application of water onto the grill is typically not done carefully due to the excitement caused by the fire and as a result, the water can extinguish the underlying fire that is cooking the food as well as the grease. In addition, the water affects the flavor of the cooked food.

Another problem with many of the prior art portable grills particularly table top grills and grills that rest directly on a surface is that the heat from the heat source is in close contact with the heat source and there is a risk that the surface can become unduly hot and burn.

In my earlier U.S. Pat. No. 5,499,574, the disclosures of which are incorporated herein by reference, there is disclosed a vertically oriented duel grill with a rack that enables both sides of the food to be cooked simultaneously and permits the grease and juices to drain from the food into a pan. By draining the grease and other liquids away from the food during the cooking process there was less of a risk that there could be a build up of carcinogens in the food due to the grilling process. In addition, there was a reduced risk of flare ups as the grease dripped into the pan at the base which was away from the flame. Although there was a reduction in the risk of flare ups due to the cooking of the fats and grease by my earlier invention, this problem was not completely solved. In addition, the problem of flare ups remains in many conventional grilling apparatus that creates a safety hazard.

OBJECTS OF THE INVENTION

It is an object of the invention to provide a grill that has a first cooking area on its upper surface and a second grilling area through a longitudinal opening in a wall of the grill. The second grilling surface has a heat source on either side of the food and permits flammable greases and fats to drip onto a reservoir of water where the risk of the grease and fat burning is reduced.

It is an object of the present invention to provide an improved duel grill that may be readily assembled and disassembled without the need for tools.

It is an object of the present invention to provide an improved duel grill that substantially reduces the risk of flare ups and other fire hazards due to burning grease.

It is another object of the invention to provide a grill that has a lower surface that contacts the ground or other surface that is insulated from the heat of the heat source thus reducing the risk that the grill will cause the surface to burn or ignite.

It is another object of the present invention to provide an improved duel grill that provides better cooking ability.

Further objects and advantages to the present invention will be apparent to those skilled in the art from the following description.

SUMMARY OF THE INVENTION

The improved grill assembly of the present invention generally has a housing comprising a front wall, a rear wall and opposing side walls, said walls being removably connected. The housing has a top surface and a bottom surface. There is a grill that is adapted to be removably applied to the upper surface of the housing. The grill provides the first grilling surface. One wall surface of the housing has a longitudinal opening for receiving a food holding accessory. The longitudinal opening permits food in the accessory to be cooked simultaneously on both sides due to the presence of a heating source on both sides and permits grease and fat to drip off the food onto the base. The base is removably connected to the housing at the housing's bottom surface. The base provides a reservoir for receiving the drippings of fat and grease and also a storage location for the grilling apparatus when it is dismantled. In a preferred embodiment the reservoir of the base may be provided with water to reduce the temperature of the dripping grease and fat so that there is a reduced risk of dangerous flare ups in the grilling process. The water also lowers the temperature of the base of the grill so that there is less likelihood that the heat from the heat source in the grill will cause the surface on which the grill is placed from scorching, burning or igniting. The grill has a first bar and a second bar and a plurality of support members extending from said first bar to said second bar and wherein at least one of either said bars or said members are preferably in the form of an inverted U for removably retaining the grill on the housing.

The housing has a pair of screens, one on each side of the food holding accessory. Each screen is connected, preferably removably to the housing. The screens have openings therein to permit heat to readily transfer from the heat source the food in the food holding accessory.

DETAILED DESCRIPTION OF THE INVENTION

Figure 1:
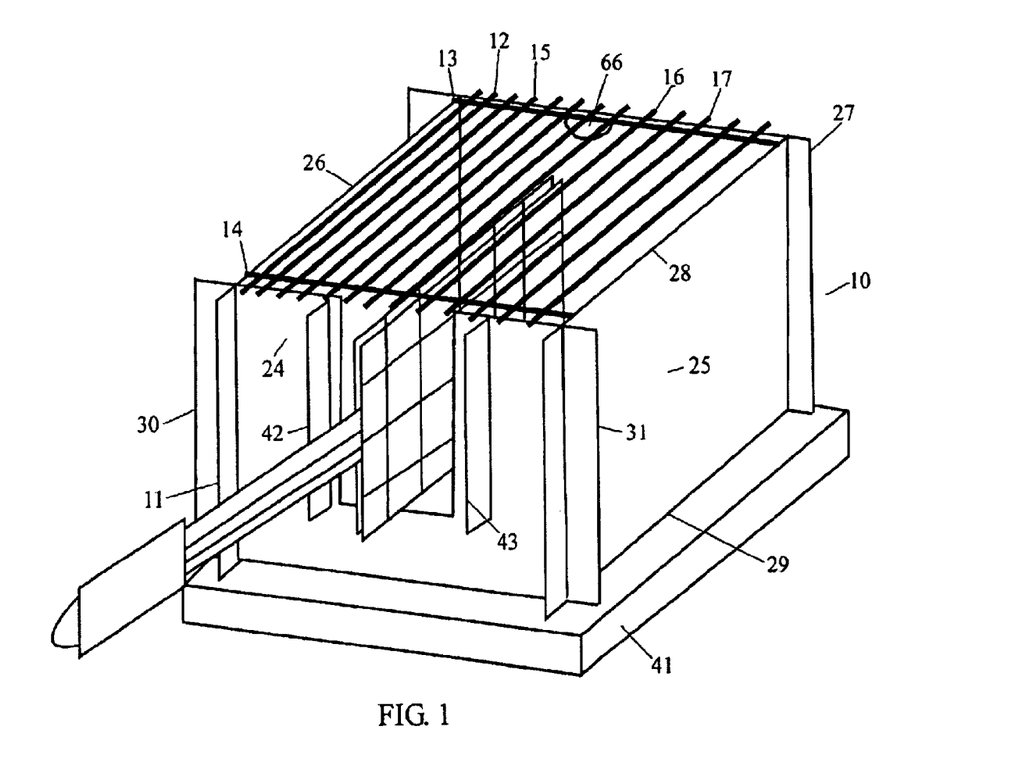
FIG. 1 is a generally top view of the grill assembly of the present invention.
Figure 2:
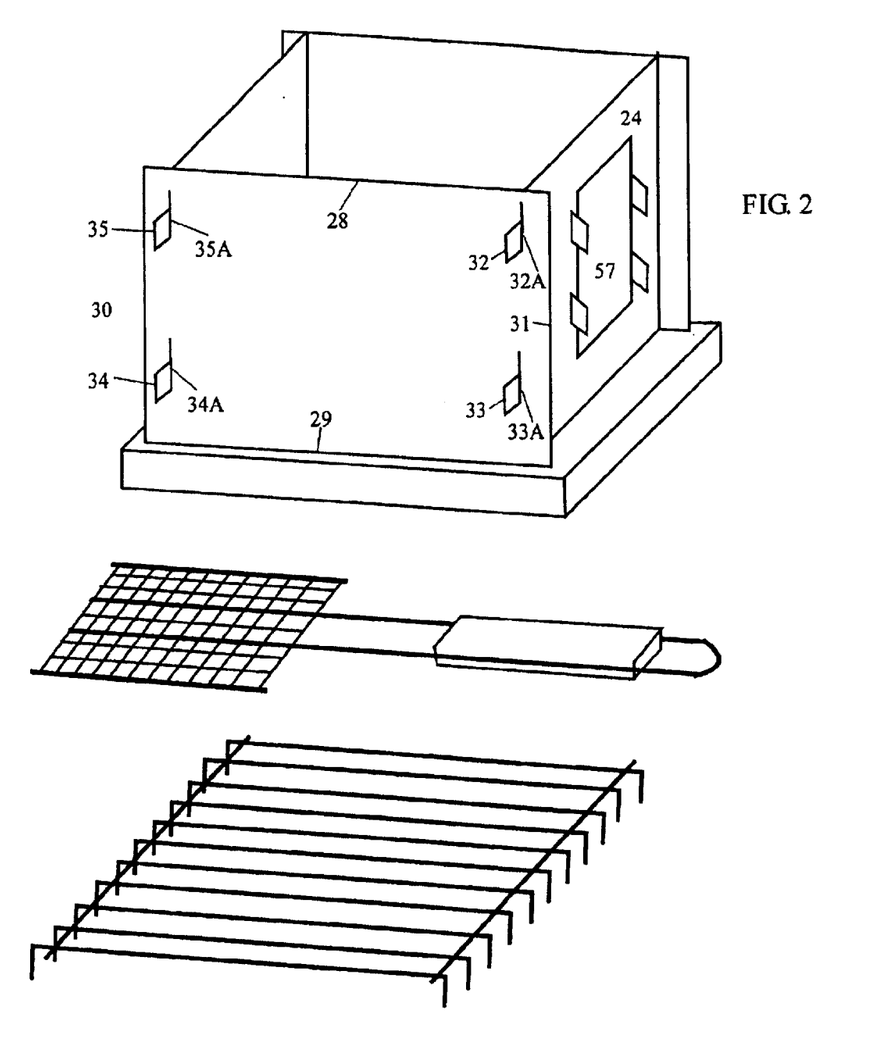
FIG. 2 is view of the grill assembly of FIG. 1 with the food receptacle for holding the food while it is being cooked being situated between the housing of FIG. 1 and the grilling surface.
Figure 3:
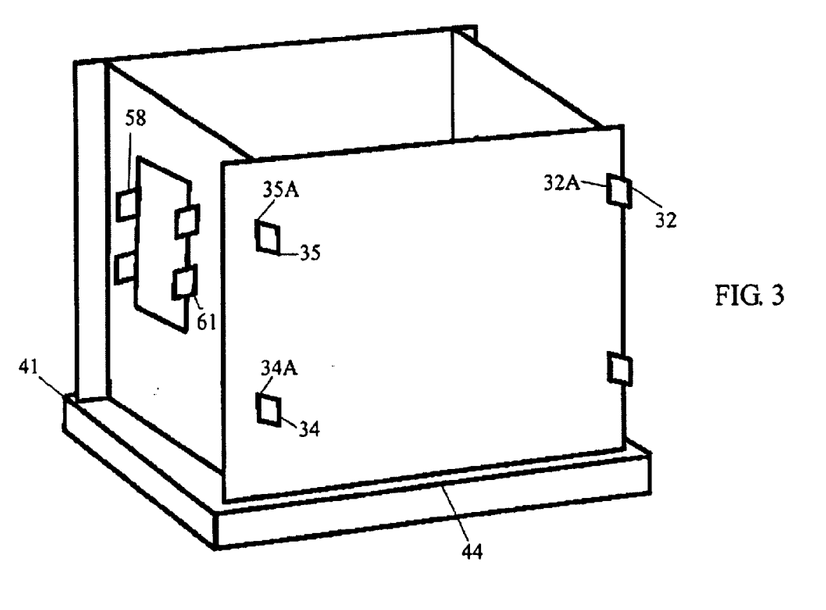
FIG. 3 is an alternative view of the apparatus shown in FIG. 2 with the food receptacle in a partially opened position.
Figure 4:
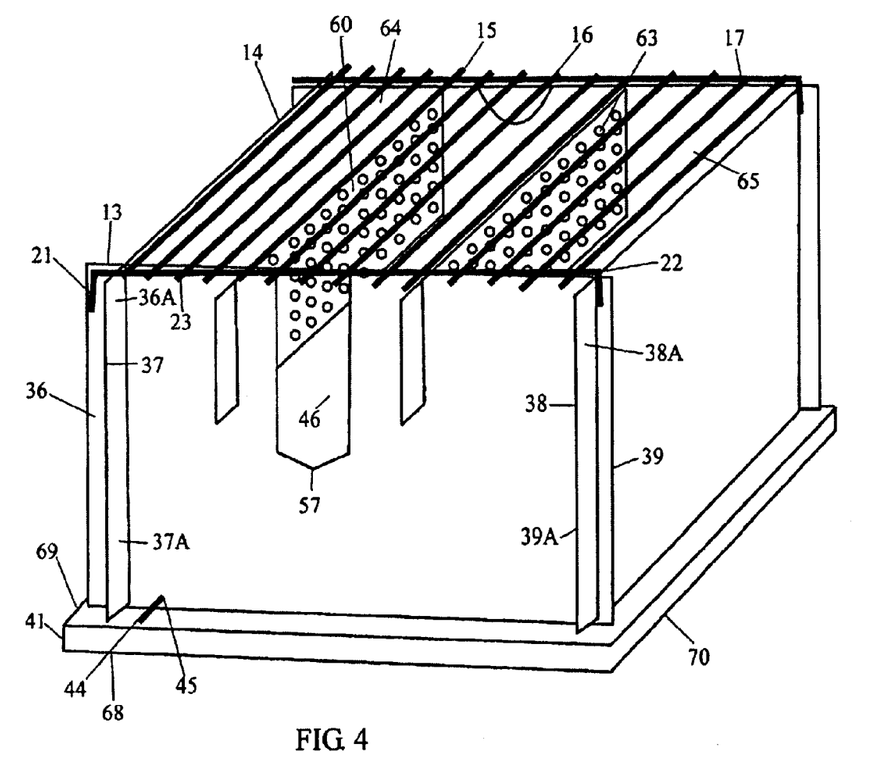
FIG. 4 is a view of the apparatus of FIG. 1 with the food receptacle removed from the housing.

FIG. 1 depicts the grill assembly 10 of the present invention. The grill assembly 10 has a housing 11 on which grill 12 is placed on the upper surface in a generally horizontal position. Grill 12 provides a first cooking surface for the food. The grill 12 is preferably used for vegetables, fish and non greasy or fatty foods although it can be used for any type of food. The grill is preferably provided with at least a pair of generally parallel bars 13 and 14. Extending from first bar 13 to second bar 14 are a plurality of support members 15, 16, 17, etc. As seen in FIG. 2, in one embodiment of the grill, the support members are generally but not necessarily in the form of an inverted U, each having a pair of legs 18 and 19 that are joined together by base member 20. As seen in FIG. 2 legs 18 and 19 are generally relatively short in comparison to the length of base member 20. First bar 13 is connected to the support members at the leg 18 and second bar 14 is connected to the support members at the leg 19. As seen in FIG. 4 the support members 15, 16, 17, etc., of the grill are generally straight and it is the first bar 13 and the second bar 14 that are generally in the form of an inverted U, each having a pair of legs 21 and 22 that are joined together by base member 23. As seen in FIG. 4 legs 21 and 22 are generally relatively short in comparison to the length of base member 23. The purpose of the legs is to assist in holding the grill to the remainder of the assembly when the device is assembled and ready for use. The grill is also readily removable from the remainder of the grill assembly for easy cleaning and storage.

Figure 6:
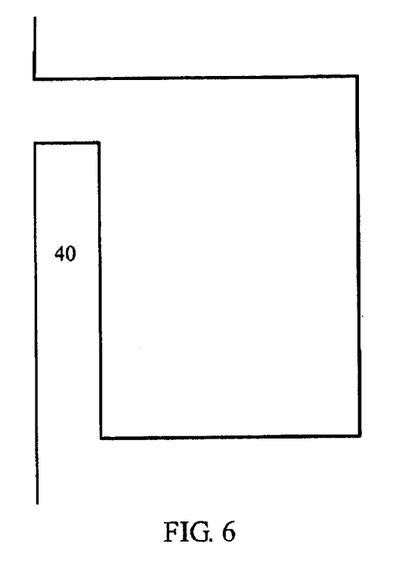
FIG. 6 depicts one example of the configuration of the tongue of the housing wall.
Figure 7:
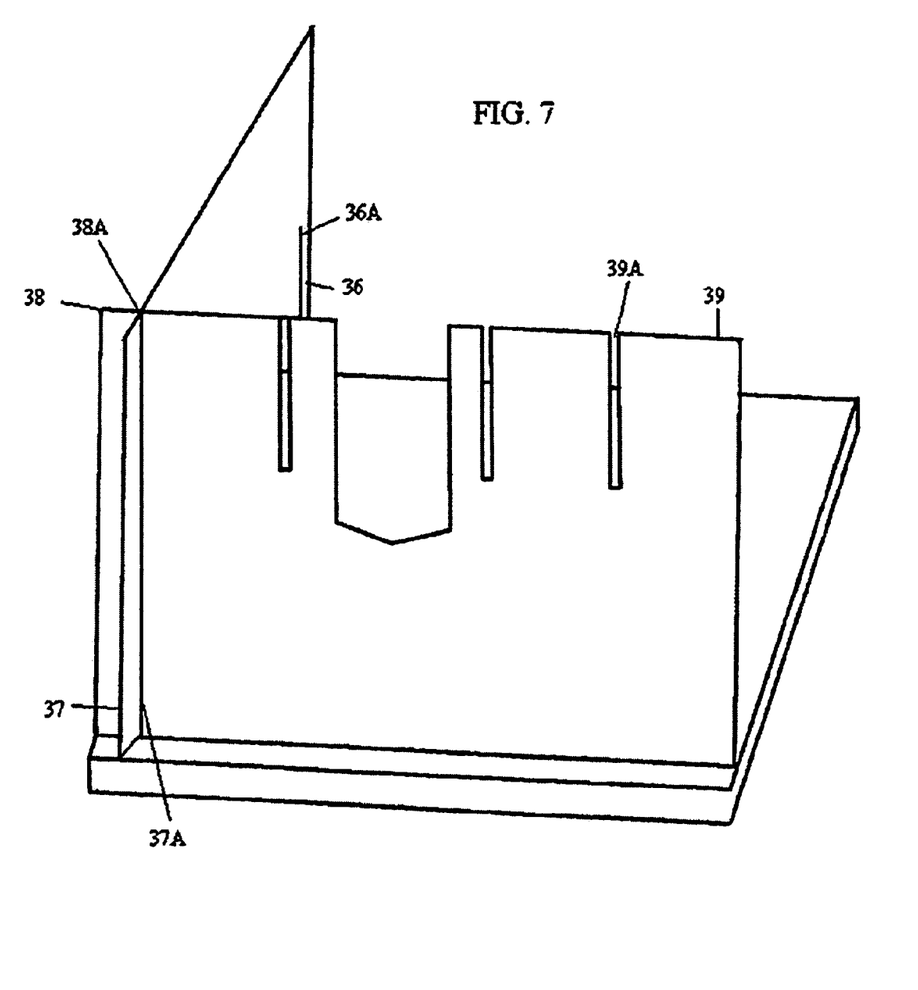
FIG. 7 shows the grill of the present invention partially assembled.
Figure 9A:
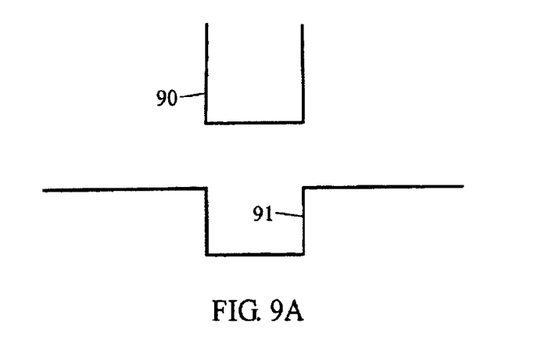
FIGS. 9A and 9B show examples of tongue and groove arrangements for connecting the walls and/or the screens to the walls.
Figure 9B:
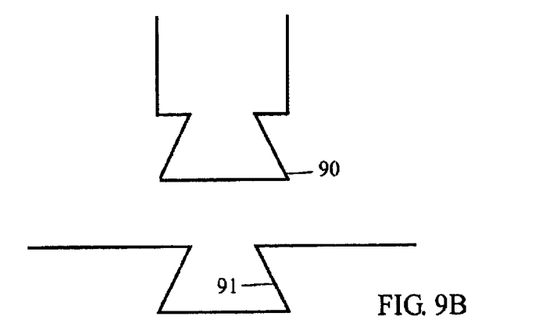
Figure 11:
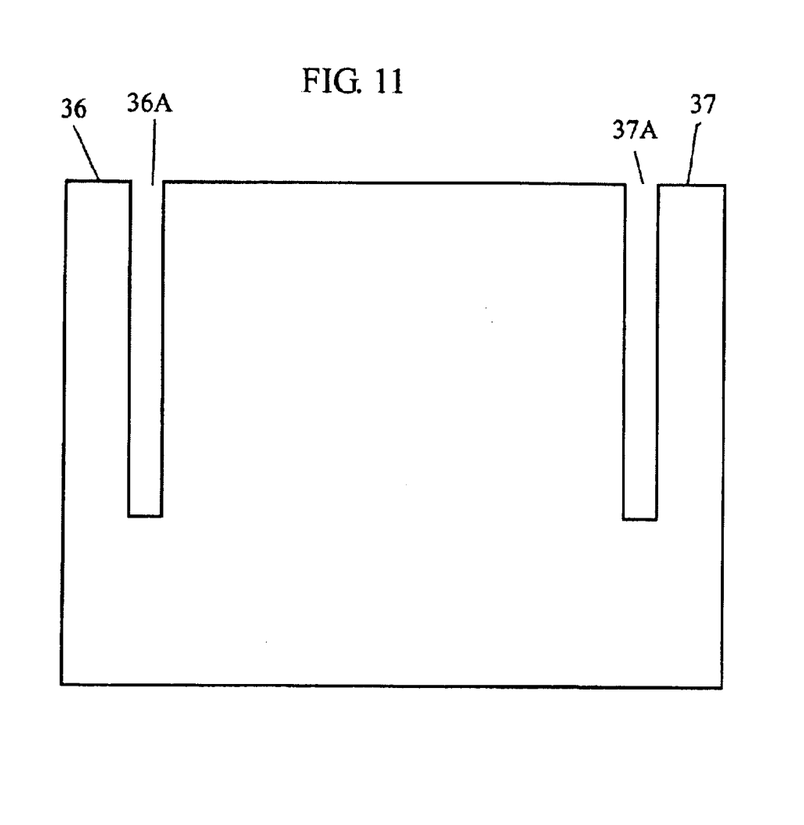
FIG. 11 shows the configuration of the sidewalls of the housing of FIGS. 1, 4 and 7.

The housing 11 is preferably formed of four walls 24, 25, 26 and 27. These walls are preferably but not required to be planar and have a top edge 28, a bottom edge 29 and a pair of side edges 30 and 31. The advantage of the planar walls is that they permit the storage of the grill in a smaller volume. The walls may preferably be removably connected together to form the housing. Assembly of the housing is by means of a tongue and groove construction. As seen in FIG. 2, a portion of the edge of each wall has a tongue 32, 33, 34, and 35 that mate with grooves 32A, 33A, 34A, and 35A in the adjacent wall surface. In one embodiment, the tongue has a rectangular cross section as does the groove. As shown in FIG. 6 the tongue has a notch 40 which holds the adjacent wall in place when the tongue passes through the slot and drops down so the wall in the area of the base of the slot prevents the tongue from being removed from the slot. If another connection for the walls is desired, the edge of a wall can have a tongue that mates with a groove. The tongue 90 and groove 91 can have a configuration such as that shown in FIGS. 9A and 9B which lock the two wall surfaces together when the tongue slides into the groove. In an alternative embodiment, tongues 36, 37, 38, and 39 enter into slots 36A, 37A, 38A and 39A on adjacent walls. In the Figures, each wall is provided with the two tongues and two slots as shown in FIG. 11.

Figure 10A:
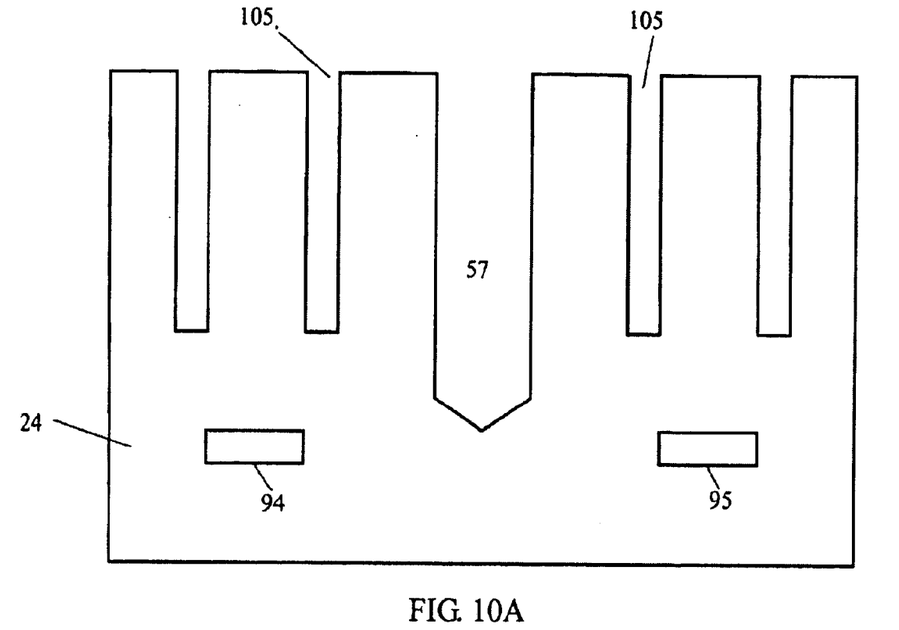
FIGS. 10A and 10B shows a front and rear wall for one embodiment of the invention.
Figure 10B:
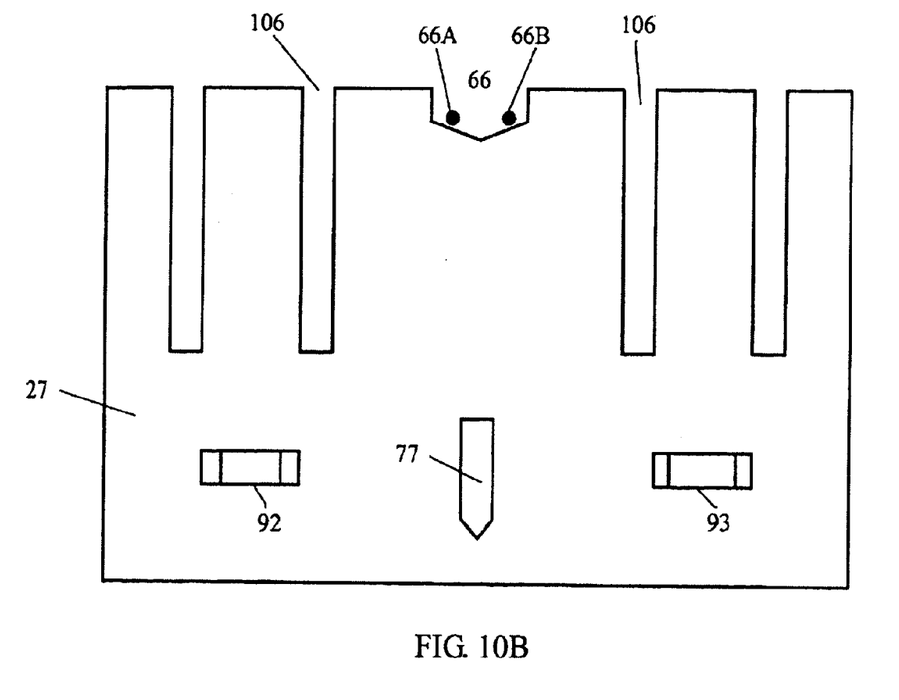

The grill assembly has a base assembly 41. The base assembly typically has a pair of upwardly extending "L" shaped members 42 and 43 which extend from a position above the floor 46 of the base into the underside of the wall assembly. These upwardly extending "L" shaped members have an arm 42A and a shelf 43A. The shelf 43A provides a surface for the charcoal or other fuel to rest. The shelf and arm can be separable to provide an even more compact storage for the grill. In one embodiment the arm and shelf can be connected together by a mortise and tenon joint or other suitable connection. As seen in FIGS. 10A and 10B, the front wall and the rear wall 27 are provided with slots 92, 93, 94 and 95 a shelf can extend from slot 92 to slot 94 and from slot 93 to slot 95 to support the heating element above the surface of the floor.

The base assembly 41 can be connected to the housing by a friction fit or if a stronger connection is desired by means of pin arrangement in which pin 44 the passes through an orifice 45 in each of the wall and member. The base assembly has knee walls 68, 69, 70 and 71 which extend upwardly a short distance above the floor 46 of the base assembly. Typically the knee walls only extend an half inch to an inch or two in height. While the knee walls can have a greater height the result is that when disassembled the package takes up a greater volume of space. The housing may be held in place by the knee walls. Preferably the knee walls frictionally retain the housing in place. However, if desired the knee walls may be connected to the housing walls by on or more pins 44 that pass through orifices 45 in the knee wall and housing. Alternatively, a latch mechanism may also be used to retain the two in position.

In a preferred embodiment the reservoir is provided with water during grilling. The purpose of the water in the reservoir is to reduce the possibility of flare ups during cooking. When the food is cooking any fat or grease dripping from the food receptacle 51 does not drip onto the hot coals but down into the reservoir where the water prevents a flare up of the hot flammable grease or fat. At least a portion of the base and the knee walls form a reservoir for holding a quantity of water. The water provides a safety feature because any flammable grease or fat or other material that drips of falls from the cooking food is extinguished when it hits the water in the reservoir. In addition, the water cools the temperature of the base and as a result there is less of a risk that the heat from the fuel could ignite the surface on which the grill is resting. In one embodiment of the invention, the reservoir is provided with a rust resistant surface.

The food receptacle 51 is a cooking rack 55 that has a pair of leaves between which the food is placed. A pair of handles, each extending from a leaf, are present. A ring 56 slips over the handles to hold the leaves together during cooking. For cooking, the food receptacle is placed into the orifice 57 in front wall 24. This provides a second cooking area for the grill. Preferably, the food receptacle 51 may be held in place by a hook or a notch 66 on rear wall 27 of the housing. In a preferred embodiment the food receptacle 51 is provided with a pair of pins 66A and 66B which pass through notch 66. The pins along with the arrow shaped configuration of the notch provide a stable resting place for the food receptacle 51. A second notch 77 may also be provided in the rear wall 27 and another one or two pins can be provided on the food receptacle 51 for additional support.

Figure 12:
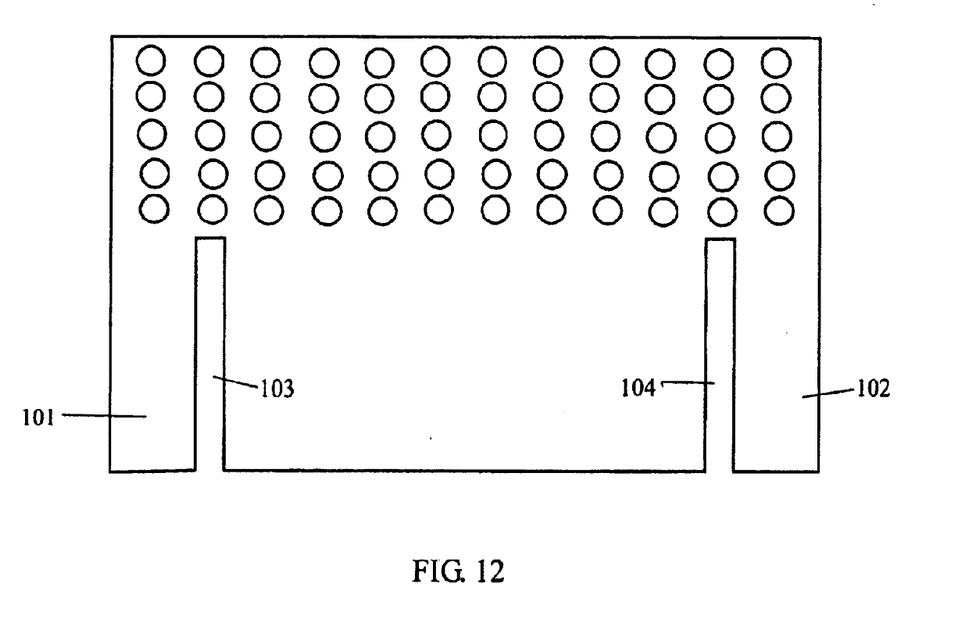
FIG. 12 shows an embodiment of the "U" shaped members for the front and rear walls of the housings of FIGS. 1, 4 and 7.
Figure 13:
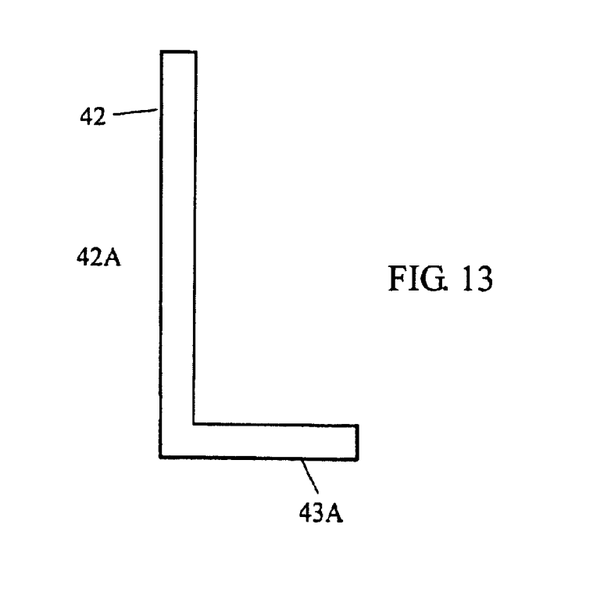
FIG. 13 shows a side view of the "L" shaped members.

The arm 42A may be provided with one or more openings to permit heat from the heating source to pass to the food in the food receptacle. In a preferred embodiment the leg 42A is provided with a plurality of openings that forms a screen for passing heat and air through the arm 42A. As seen in FIG. 12 the "L" shaped member has a pair of tongues 101 and 102 as well as slots 103 and 104. The slots in the "L"shaped member line up with the slots 105 and 106 in the front and rear walls. Alternatively, instead of arm 42A, screen members 60 and 63 may be present instead of the "L" shaped members. The screen members are preferably removably connected to the front and rear wall. The screen members may be connected to the front and rear wall by any suitable means. For example, the front wall 24 and rear wall 27 may be provided with one or more slots on each side of the longitudinal orifice 57. Extending from slot 58 in the front wall 24 to the corresponding slot in rear wall 27 is screen member 60. Similarly, extending from slot 61 in the front wall 24 to slot 62 in rear wall 25 is screen member 63. In an alternative embodiment, the interior wall surfaces may be provided with a groove instead of a slot and the screen can be provided with a tongue that mates with the groove similar to the manner in which the wall may be connected. The screen members typically extend generally the height of the wall to provide as much area for fuel as possible. The screen members form receptacles 64 and 65 for the heating source for the grill assembly whether it be wood, charcoal, electric heat, etc. Where the fuel is wood or charcoal the fuel is placed into the receptacles and ignited. Alternatively, electric heating elements way be present in the receptacles to provide the heat for cooking. As shown in FIG. 2 the screen members do not extend from the bottom of the housing to the top but end a short distance from the top surface of the housing. A cover (not shown) extending at least from the upper surface of the first screen to the upper surface of the second screen may be present. In this embodiment, fuel such as charcoal may be placed in the housing as well as in the area above the screens to provide two areas for cooking. This cover protects the food cooking in the food receptacle from ash when the first cooking surface is used.

In use, the grill assembly is formed without the need for tools by connecting a first wall and a second wall by means of a tongue and groove. The tongue of one wall surface slips into the groove at one end of the second wall surface where it is held in place. The remaining walls may be connected in a similar manner to form the entire housing. Alternatively, the grill assembly may formed by connecting a first wall and a second wall by means of the tongue and slot so that the notch of the tongue prevents the first and second wall from being separated until desired by the user. In the same manner the remaining two walls may be connected to the assembly of the first and second walls. The "L" shaped members may be placed in position by connecting each shelf to opposing walls of the housing. Instead of the "L" shaped members, the screen members may be placed in position so that they extend from the front wall to the rear wall. The housing so formed can be placed over the base such that the knee walls frictionally retain the walls of the housing. Alternatively, the housing can be placed between the knee walls and connected by a suitable means. The grill 12 is placed on the housing so that at least a portion of the grill extends downwardly adjacent to the outer surface of two opposing walls of the housing. Preferably, water is placed in the base reservoir. One of the advantages of the grill assembly of the present invention is the superior heat that is generated in the grill assembly because of the quantity of heat generated there is no need to have holes placed in the base or the side walls to improve the flow of air to the fuel.

When the grill assembly 10 is no longer needed, the assembly may also be disassembled without the need for tools. The grill 12 is lifted off the housing. The water may be removed from the base and the base may be separated from the housing. The walls of the housing may be separated and the "L" shaped member or screen members can be removed from the front and rear walls.

The grill assembly may be formed of any suitable heat resistant material such as metal, a ceramic or porcelain material, etc. Preferably, a rust resistant material is also used. The base of the grill assembly may be flat on its underside to permit it to rest evenly on a surface. Alternatively, the base may be provided with legs. The legs may be adjustable to permit the grill assembly to rest on an uneven surface.

Figure 8A:
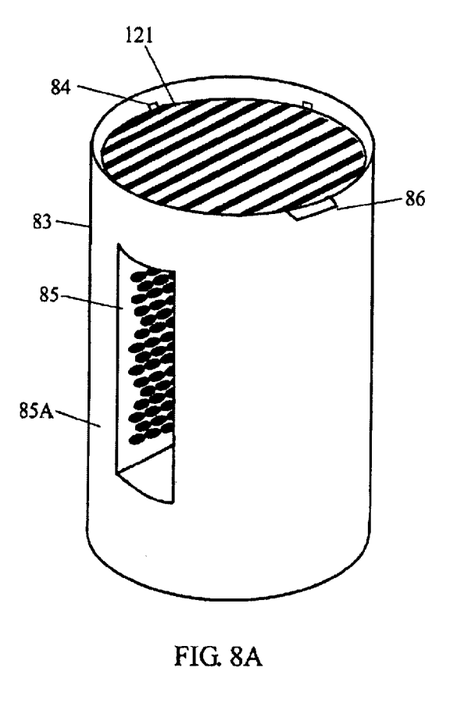
FIGS. 8a–c show an alternative embodiment of the grill assembly of the present invention in which the housing is generally cylindrical.
Figure 8B:
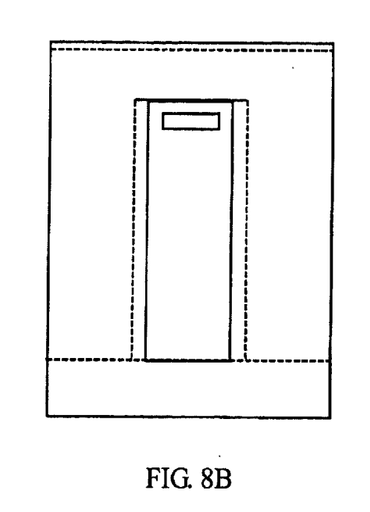
Figure 8C:
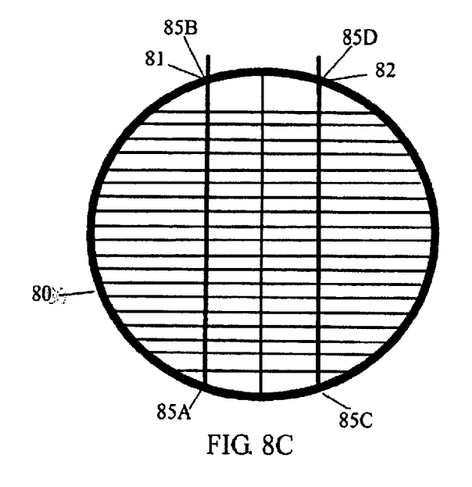

FIG. 8 depicts an alternative embodiment of the present invention. In this embodiment the wall surfaces are not planar but rather form a generally circular housing. The grill, FIG. 8C, may have a singular circular bar 80 with one or more of the support members 81, 82 etc. having the generally unshaped configuration discussed above which hold the grill in place on the top surface of the housing 83. Alternatively, the grill may rest on pins 84 extending from the inside surface of the housing. The remaining features of the circular housing can be the same as in the other embodiments. In one embodiment, the screen 85 can be welded to the inside walls of the housing. Although the housing in FIG. 8 is depicted as a single piece the housing may be comprised of a plurality of curved wall-surfaces that connect as described above in connection with the planar housing. In this embodiment the wall surfaces are individual arcs of a circle and connect together to form a generally circular structure. Also handles 86 may be present on the outside walls of the grill to facilitate movement of the grill.

In an alternative embodiment of the grill of FIG. 8 the grill has a top surface 121 for placement of food products for cooking purposes. In one embodiment, removably attached to the grill are two screens 85 that extend downwardly from the under surface of the top surface 121. The screens may be made of thin rods welded to a frame member or may have desired another configuration. The top surface 121 of the grill is usually formed from a metal ring with a plurality of rods extending from one side of the ring to the other to provide a support surface for the food products being cooked. Extending upwardly from the top surface of the grill may be a pair of handles.

In an alternative embodiment, the top surface 121 may be removable and there may be a meshed or screened section that extends from edge 85A to 85B of the screen 85 along the inside curved wall of the housing. Similarly, there may also be a meshed or screened section that extends from edge 85C to 85D of the screen 85 along the inside curved wall of the housing. Handles may be attached to the screened section along the curved portion. The pockets thus formed by the screen permit the user to place the charcoal in the pockets and to carry that assembly along with the charcoal and to be able to insert the assembly into the housing. Similarly, when the cooking is done, the assembly containing the hot coals can be removed from the housing. This is advantageous when the coals are still hot because the grill can be removed and the hot coals can be readily extinguished by dousing with water or dipping the assembly into a bucket or other water source.

Figure 5:
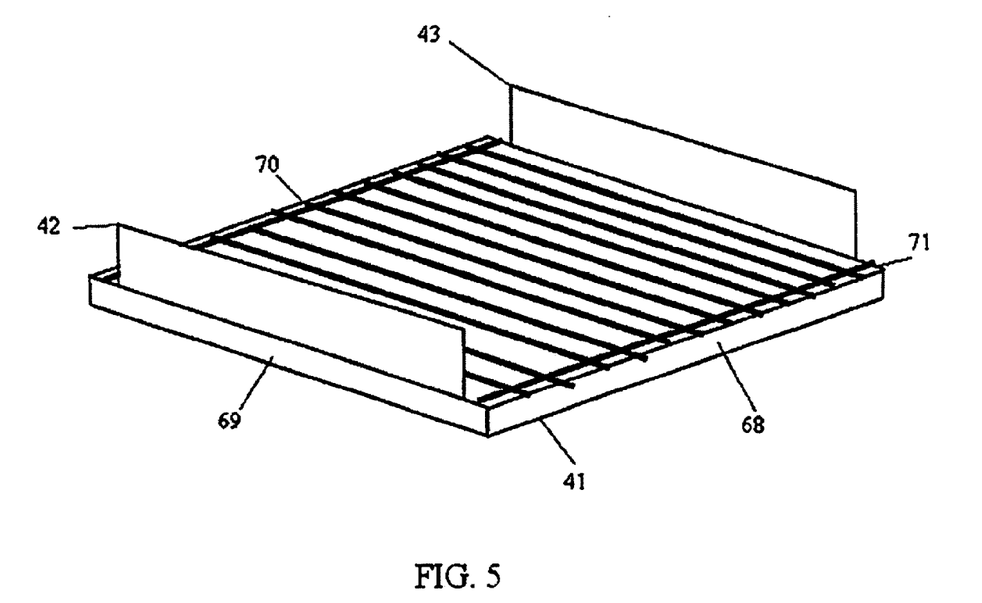
FIG. 5 shows the grill assembly of the present invention in its storage condition with all the pieces in the base.

The size of the base of the grill and the height of the knee walls are selected so that the walls may be stored in the base. Similarly, the "L" shaped member and the grill are also sized to permit placement of the pieces in the base for easy storage. The disassembled grill with the pieces stored in the base is shown in FIG. 5. The shelves of the two "L" shaped members are shown as rising above the surface of the stored grill in FIG. 5. If a more compact arrangement is desired the shelves may separated from the legs and laid on the remaining pieces for storage.

I claim:

1. An improved grill assembly that may be assembled and disassembled without the use of tools comprising
    a housing said housing comprising a front wall, a rear wall and opposing side walls, said front and rear walls being removably connected to each of said side walls, said housing having a top surface and a bottom surface, and
    a grill on the top surface of said housing, and
    a base which receives the bottom surface of said housing, wherein said base is provided with a knee wall that retains the housing in place in the assembly, said point wall having an opening for receiving a food receptacle and wherein said base has a pair of upwardly extending "L" shaped members which extend from the base, said each of said "L" shaped members comprising a leg and a shelf, each of said shelves being adapted to be connected to opposing side walls of the housing said "L" shaped members forming a receptacle for a heating element to heat food in said food receptacle, said shelf providing a surface for fuel for cooking food on said grill said base comprising a reservoir adapted to receive water for reducing the risk of fire due to burning grease, fat or other flammable material.

2. The grill assembly according to claim 1 wherein said grill comprises a first bar and a second bar and a plurality of support members extending from said first bar to said second bar and wherein at least two of either said bars or said members are in the form of an inverted U for removably retaining said grill on said housing.

3. The grill assembly according to claim 2 wherein at least one of either said bars or said members has a first leg and a second leg that are joined together by base member.

4. The grill assembly according to claim 3 wherein the length of the legs is relatively short in comparison to the length of base member.

5. The grill assembly according to claim 1 wherein the walls are connected by means of tongues which enter into corresponding slots in an adjacent wall.

6. The grill assembly according to claim 5 wherein said tongue has a notch that holds the tongue in place in the slot.

7. The grill assembly according to claim 1 wherein the walls are connected by means of tongues which enter into corresponding grooves in an adjacent wall.

8. The grill assembly according to claim 7 wherein said groove and said tongue have a mating profile that causes said tongue to be retained in said groove.

9. A grill assembly comprising a housing having a top edge forming an opening and a side wall extending from said top edge and a bottom surface extending from said side wall, said side wall and bottom surface forming a cavity, said side wall hiving at least one opening for ventilation;
    a grill assembly comprising a first pocket and a second pocket for receiving solid fuel, said first pocket being separated from said second pocket by a width of said opening in said sidewall, each said pocket having a sidewall having a first end and a second end and a base extending from said sidewall, said pocket being opened at one end; said sidewall having a plurality of openings therein to permit ventilation;

said grill assembly being adapted to receiver a grilling surface over said opening of said pocket.

10. An improved grill assembly that may be assembled and disassembled without the use of tools comprising a housing said housing comprising a front wall, a rear wall and opposing side wall, said front and rear walls being removably connected to each of said side walls, said housing having a top surface and a bottom surface, wherein the walls are connected by means of tongues which enter into corresponding slots in an adjacent wall, said groove and said tongue have a mating profile that causes said tongue too be retained in said groove, said mating profile on said tongue including a notch, and a grill on the top surface of said housing, said grill comprising a first bar and a second bar and a plurality of support members extending from said first bar to said second bar and wherein at least two of either said bars or said members are in the form of an inverted U for removably retaining said grill on said housing, and wherein at least one of either said bars or said members has a first leg and a second leg that are joined together by base member, the length of said legs being relatively short in comparison to the length of base member, and a base which receives the bottom surface of said housing, wherein said base is provided with a knee wall that retains the housing in place in the assembly, said base comprising a reservoir adapted to receive water for reducing the risk of fire due to burning grease, fat or other flammable material.

11. An improved grill assembly that may be assembled and disassembled without the use of tools comprising a housing said housing comprising a front wall, a rear wall and opposing side walls, said front and rear walls being removably connected to each of said side walls, said housing having a top surface and a bottom surface, wherein the walls are connected by means of tongues which enter into corresponding slots in an adjacent wall, said slots and said tongue have a mating profile that causes said tongue too be retained in said slot, and a grill on the top surface of said housing, said grill comprising a first bar and a second bar and a plurality of support members extending from said first bar to said second bar and wherein at least two of either said bars or said members are in the form of an inverted U for removably retaining said grill on said housing, and wherein at least one of either said bars or said members has a first leg and a second leg that are joined together by base member, the length of said legs being relatively short in comparison to the length of base member, and a base which receives the bottom surface of said housing, wherein said base is provided with a knee wall that retains the housing in place in the assembly, said base comprising a reservoir adapted to receive water for reducing the risk of fire due to burning grease, fat or other flammable material, said base and housing being connected by a pin that passes through an orifice in said knee wall and said housing.

12. The grill assembly according to claim 11 wherein on one of the walls has an orifice for receiving a food receptacle.

13. An improved grill assembly that may be assembled and disassembled without the use of tools comprising a housing said housing comprising a front wall, a rear wall and opposing side walls, said front and rear walls being removably connected to each of said side walls, said housing having a top surface and a bottom surface, wherein the walls are connected by means of tongues which enter into corresponding grooves in an adjacent wall, said groove and said tongue have a mating profile that causes said tongue too be retained in said groove and wherein there is a first screen member that extends from a first wall to the opposing second wall of said housing and a second screen member that extends from a firstwall to the opposing second wall of said housing, and a grill on the top surface of said housing said grill comprising a first bar and a second bar and a plurality of support members extending from said first bar to said second bar and wherein at least two of either said bars or said members are in the form of an inverted U for removably retaining said grill on said housing, and wherein at least one of either said bars or said members has a first leg and a second leg that are joined together by base member, the length of said legs being relatively short in comparison to the length of base member, and a base which receives the bottom surface of said housing, wherein said base is provided with a knee wall that retains the housing ii place in the assembly, said base comprising a reservoir adapted to receive water for reducing the risk of fire due to burning grease, fat or other flammable material.

14. An improved grill assembly that may be assembled and disassembled without the use of tools comprising a housing said housing comprising a front wall, a rear wall and opposing side walls, said front and rear walls being removably connected to each of said side walls, said housing having a top surface and a bottom surface, said walls being connected by means of tongues which enter into corresponding slots in an adjacent wall, said tongue having a notch that holds the tongue in place in the slot, and a grill on the top surface of said housing, said grill comprising a first bar and a second bar and a plurality of support members extending from said first bar to said second bar and wherein at least two of either said bars or said members are in the form of an inverted U for removably retaining said grill on said housing, at least one of either said bars or said members having a first leg and a second leg that are joined together by base member, the length of the legs being relatively short in comparison to the length of base member and a base which receives the bottom surface of said housing, wherein said base is provided with a knee wall that retains the housing in place in the assembly, said base comprising a reservoir adapted to receive water for reducing the risk of fire due to burning grease, fat or other flammable material.

* * * * *